United States Patent
Cheng et al.

(10) Patent No.: US 6,469,485 B2
(45) Date of Patent: Oct. 22, 2002

(54) ACTIVE FILTER AND METHOD FOR SUPPRESSING CURRENT HARMONICS

(75) Inventors: Louis Cheng, Scarborough; Qihua Zhao, Mississauga, both of (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/846,045

(22) Filed: May 1, 2001

(65) Prior Publication Data

US 2002/0043968 A1 Apr. 18, 2002

Related U.S. Application Data (60) Provisional application No. 60/216,806, filed on Jul. 7, 2000.

(51) Int. Cl.[7] .............................. G05F 1/40; H02M 1/12
(52) U.S. Cl. ......................................... 323/286; 363/39
(58) Field of Search ............................... 323/282, 285, 323/286; 363/39, 45, 46, 47

(56) References Cited

U.S. PATENT DOCUMENTS

| | | | | |
|---|---|---|---|---|
| 3,849,677 A | * | 11/1974 | Stacey et al. | .................. 333/17 |
| 4,247,888 A | | 1/1981 | Angquist | ..................... 363/47 |
| 4,757,434 A | | 7/1988 | Kawabata et al. | |
| 5,132,894 A | | 7/1992 | Rozman | ........................ 363/51 |
| 5,483,148 A | | 1/1996 | Torrey | ......................... 323/205 |
| 5,563,487 A | | 10/1996 | Davis | |
| 5,731,965 A | * | 3/1998 | Cheng et al. | .................. 363/41 |
| 5,757,099 A | * | 5/1998 | Cheng et al. | ............... 307/105 |
| 5,821,725 A | | 10/1998 | Wang et al. | |
| 5,834,969 A | | 11/1998 | Umeyama et al. | |
| 5,910,889 A | | 6/1999 | Larsen et al. | |
| 6,069,810 A | | 5/2000 | Wissmach et al. | |

FOREIGN PATENT DOCUMENTS

| | | | |
|---|---|---|---|
| DE | 44 06 402 C1 | 4/1995 | ............. H02M/1/12 |
| DE | 197 30 185 A1 | 4/1998 | ............. H02J/3/01 |

OTHER PUBLICATIONS

Patent Abstracts of Japan vol. 14, No. 67 (E-885)—JP 01 286770 A (Toshiba Corp), Nov. 17, 1989 abstract; figures 1, 2.

* cited by examiner

*Primary Examiner*—Matthew Nguyen
(74) *Attorney, Agent, or Firm*—Larry J. Palguta

(57) ABSTRACT

An active filter (100) suppresses current harmonics generated in a dc bus (300) by generating a compensating current that is approximately equal-but-opposite in polarity to the current harmonics. In one implementation, the active filter (100) includes: an energy storage capacitor (103); a choke (104); a switch circuit (120); and a controller (150). The controller (150) receives a current harmonics measurement for the dc bus (300) and generates switch gating signals (156a, 156b) as a function of the current harmonics measurement. The switch circuit (120) receives the switch gating signals (156a, 156b) from the controller (150) and is operatively connected to the energy storage capacitor (103) and the choke (104) to selectively discharge the energy storage capacitor (103) to inject current into the dc bus (300) and to selectively draw current from the dc bus (300) via the choke (104).

23 Claims, 6 Drawing Sheets

US 6,469,485 B2

ACTIVE FILTER AND METHOD FOR SUPPRESSING CURRENT HARMONICS

RELATED APPLICATION

This application claims priority under 35 U.S.C. §119(e) of U.S. Provisional Application No. 60/216,806 filed on Jul. 7, 2000, the entire contents of which are herein incorporated by reference.

BACKGROUND OF THE INVENTION

1. Field of the Invention

This invention relates to electrical current harmonics suppression.

2. Description of Prior Art

Mechanical loads, such as Switched Reluctance Machines (SRMs), that operate by chopping a dc electrical current into intermittent pulses generate large amounts of current harmonics, thereby causing heating and other disturbances that negatively affect neighboring devices. Conventionally, passive capacitor-inductor filters have been used to suppress such current harmonics. This conventional approach to current harmonics suppression, however, is associated with drawbacks due to the large size and heavy weight of the necessary capacitors and inductors, particularly in high-power applications. Furthermore, the conventional passive capacitor-inductor filter arrangement must either be designed for or tuned to a particular fundamental frequency of the current harmonics. Because many mechanical loads operate over a range of rpms, resulting in a range of fundamental frequencies for the resulting current harmonics, the conventional passive capacitor-inductor filter arrangement cannot be readily implemented to suppress current harmonics generated by such devices.

SUMMARY OF THE INVENTION

In accordance with the present invention, the above drawbacks of the conventional current harmonics suppression technique are resolved through use of an active filter that monitors current harmonics present in a dc bus and generates a compensating current waveform that is approximately equal-but-opposite in polarity to the monitored current harmonics of the dc bus. The active filter of the present invention generates the compensating current waveform by selectively and repeatedly activating a switch that discharges an energy storage capacitor to inject current into the dc bus and a switch that traps current harmonics from the dc bus via a choke. The frequency at which the active filter of the present invention repeatedly activates the switch to discharge the energy storage capacitor is sufficiently greater than the fundamental frequency of the current harmonics to minimize size of the energy storage capacitor, particularly in high-power applications. Furthermore, because the active filter generates switching signals to repeatedly discharge the energy storage capacitor and trap harmonics current from the dc bus as a function of the monitored current harmonics, the active filter is applicable to a wide range of fundamental frequencies for the current distortion and, thus, is suitable for suppressing current harmonics generated by a variety of load conditions.

According to an embodiment of the present invention, an active filter arrangement for generating a compensating current to suppress current harmonics in a dc bus includes: an energy storage capacitor; a choke (i.e., inductor); a controller; and a switch circuit. The controller receives a current harmonics measurement for the dc bus and outputs switch gating signals to the switch circuit as function of the current harmonics measurement. The switch circuit is operatively connected to the energy storage capacitor to repeatedly discharge the energy storage capacitor based on switch gating signals from the controller to inject current into the dc bus. The switch circuit is also operatively connected to the choke to repeatedly trap current harmonics from the dc bus to ground.

In one implementation, the switch circuit is a half-bridge inverter configuration that includes two switches and two anti-parallel diodes connected to the switches. In this implementation, the output choke is connected between the dc bus and the junction between the first and second switches and the energy storage capacitor is connected between the two ends of the half-bridge inverter. When the first switch is set to an ON state by the filter controller, the energy storage capacitor discharges to inject current into the dc bus. When the second switch is set to an ON state by the filter controller, current harmonics from the dc bus are trapped to ground through the choke. When both the first and second switches are in the OFF state, energy stored in the choke will flow across one of the anti-parallel diodes to charge the energy storage capacitor. The filter controller limits ON durations of the first and second switches in accordance with a switch-timing signal. By using a switch-timing signal that has a high frequency relative to the fundamental frequency of the current harmonics, the filter controller will repeatedly activate the first and second switches during each period of the current harmonics, thereby enabling a relatively small energy storage capacitor to discharge sufficient current during each period of the current harmonics to approximately offset the current harmonics.

In one implementation of the present invention, the filter controller generates the gate switching signals for the first and second switches by comparing a high-frequency dual triangular wave, which serves as the switch-timing signal, with an error signal, which indicates the difference between the current harmonics measurement and the compensating current.

BRIEF DESCRIPTION OF THE DRAWINGS

Other aspects and advantages of the present invention will become apparent upon reading the following detailed description and upon reference to the drawings, in which.

DETAILED DESCRIPTION

Figure 1:
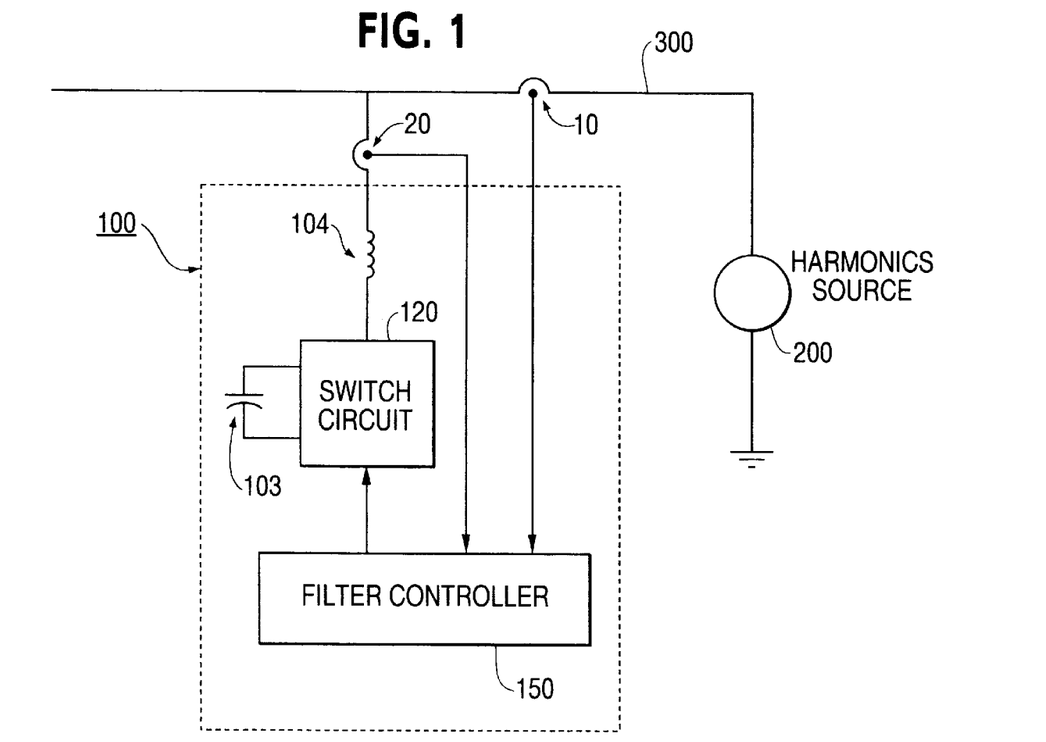
FIG. 1 shows an exemplary implementation of an active filter that suppresses current harmonics in a dc bus in accordance with the principles of the present invention.

FIG. 1 shows an exemplary implementation of an active filter 100 for suppressing current harmonics in a dc bus 300 generated by a harmonics source 200, such as an SRM, in accordance with the present invention. The active filter 100 includes: 1) an energy storage capacitor 103; 2) an output choke (i.e., inductor) 104; 3) a switch circuit 120; and 4) a filter controller 150. As seen in FIG. 1, the output choke 104 is connected between the switch circuit 120 and the dc bus 300, the switch circuit is connected to receive control signals from the filter controller 150, and both terminals of the energy storage capacitor are connected to the switch circuit 120. The filter controller 150 receives current harmonics measurements from a first current sensor 10, after the dc component of the measured current has been removed (not shown in FIG. 1), to monitor the current harmonics in the dc bus 300. The filter controller 150 also receives compensating current measurements from a second current sensor 20.

With the configuration illustrated in FIG. 1, the filter controller 150 monitors current harmonics present in the dc bus 300 and generates switch gating signals as a function of the current harmonics measurements to repeatedly activate the switch circuit 120 to discharge the energy storage capacitor 103 to inject current into the dc bus and to repeatedly activate the switch circuit 120 to trap current harmonics from the dc bus via the output choke 104, thereby generating a compensating current that is approximately equal-but-opposite in polarity to the current harmonics. This operation will become clearer from the following description of an embodiment of the present invention.

Figure 2:
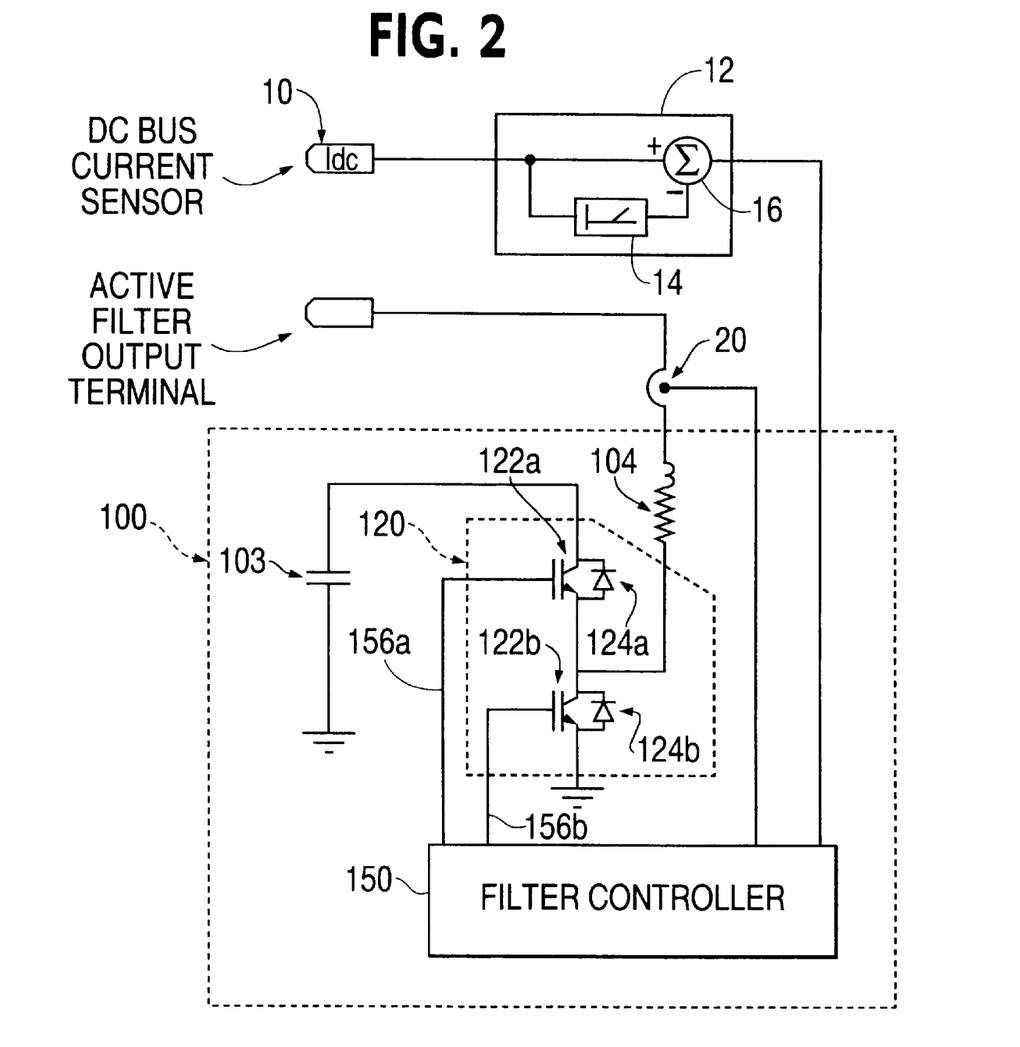
FIG. 2 shows an active filter configuration for suppressing current harmonics in a dc bus in accordance with an embodiment of the present invention.

FIG. 2 shows a configuration of the active filter 100 in accordance with an embodiment of the present invention. As seen in FIG. 2, the switch circuit 120 includes a first switch 122a and a second switch 122b, which are n-channel Insulated Gate Bipolar Transistors (IGBTs) in the implementation shown in FIG. 2. For the first switch 122a, the collector is connected to a first terminal of the energy storage capacitor 103, the emitter is connected to the collector of the second switch 122b and the output choke 104, and the gate is connected to receive first switch gating signals 1 56a from the filter controller 150. For the second switch 122b, the emitter is connected to ground, the collector is connected to the emitter of the first switch 122a and the output choke 104, and the gate is connected to receive second switch gating signals 156b from the filter controller 150. The switch circuit 120 further includes a pair of anti-parallel diodes 124a, 124b. The anode of the first anti-parallel diode 124a is connected to the emitter of the first switch 122a and the cathode of the first diode 124a is connected to the collector of the first switch 122a. The anode of the second diode 124b is connected to the emitter of the second switch 122b and the cathode of the second diode 124b is connected to the collector of the second switch 122b. Thus, the switch circuit 120 illustrated in accordance with an embodiment of the present invention is configured as a half-bridge inverter.

The filter controller 150 outputs the first and second switch gating signals 156a, 156b to the first and second switches 122a, 122b, respectively. As will be described below in more detail, the filter controller 150 generates the first and second switch gating signals 156a, 156b as a function of current harmonics measurements from the first current sensor 10 and compensating current measurements from the second current sensor 20. As shown in FIG. 2, a dc-removing circuit 12 is provided between the first current sensor 10 and the filter controller 150 to extract the ac (i.e., harmonics) component of the current measured by the first current sensor 10. The dc-removing circuit 12 includes a low-pass filter 14 loop which feeds the dc component of the current measured by the first current sensor 10 to a combiner 16 which also directly receives the measured current, thereby removing the dc component therefrom.

With the switch circuit configuration illustrated in FIG. 2, when the first switch gating signal 156a sets the first switch 122a to an ON state, the energy storage capacitor 103 discharges to inject current into the dc bus 300. On the other hand, when the second switch gating signal 156b sets the second switch 122b to an ON state, current harmonics from the dc bus 300 are trapped to ground through the output choke 104. When both the first and second switches 122a, 122b are OFF, energy stored in the output choke 104 will flow across the first anti-parallel diode 124a to charge the energy storage capacitor 103. As will be described in more detail below, the filter controller 150 limits ON durations of the first and second switches 122a, 122b in accordance with a switch-timing signal having a high frequency relative to the fundamental frequency of the current harmonics, thereby repeatedly setting the first and second switches 122a, 122b to the ON state during each period of the current harmonics and, thus, allowing the energy storage capacitor 103 to be relatively small while still discharging sufficient compensating current.

Figure 3:
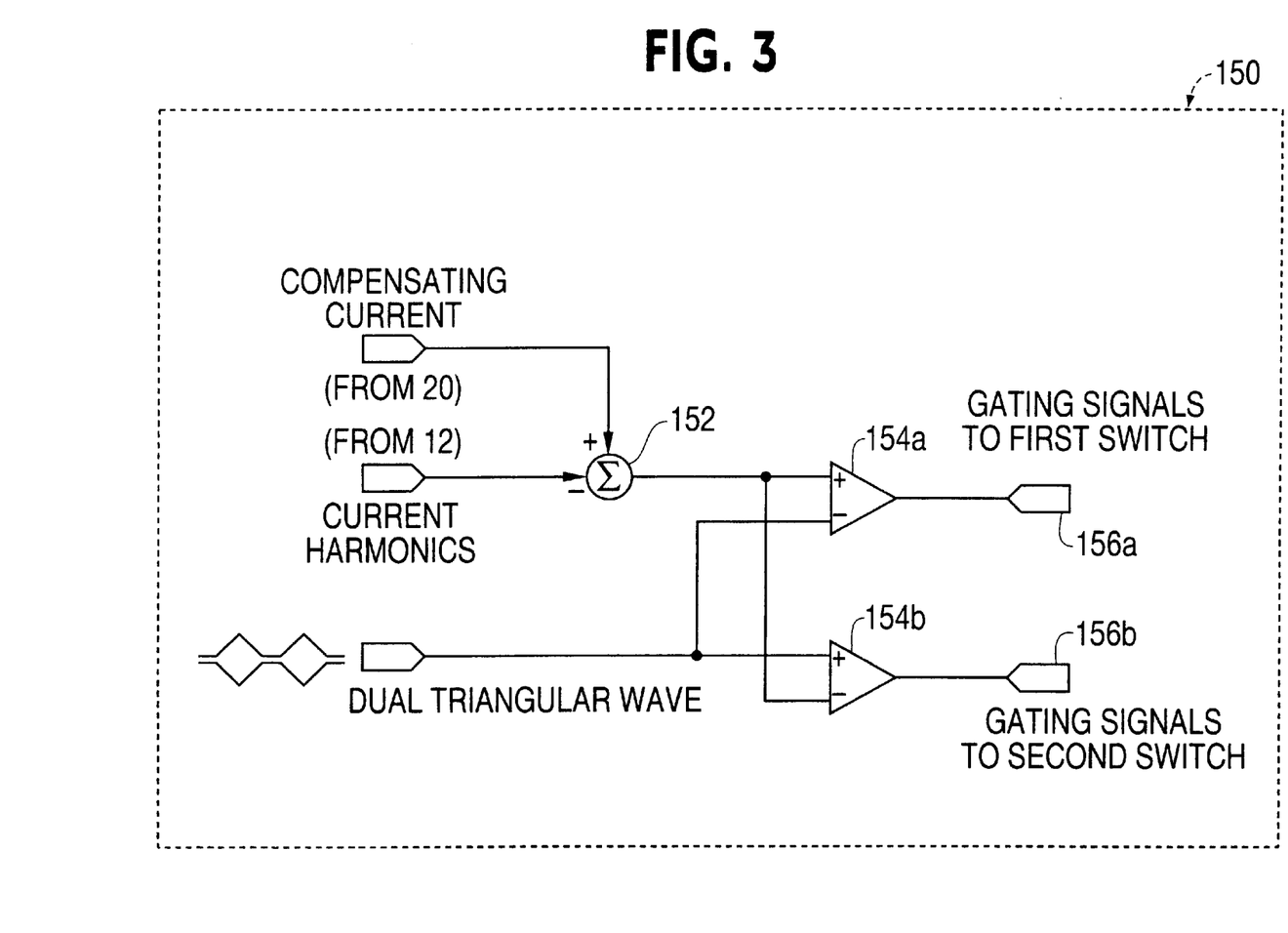
FIG. 3 shows a filter controller configuration for the active filter illustrated in FIG. 2 in accordance with an implementation of the present invention.

FIG. 3 shows an exemplary configuration of the filter controller 150. The filter controller 150 includes a combiner 152 that combines the current harmonics measurement from the first current sensor 10 (via the dc-removing circuit 12) and the compensating current measurement from the second current sensor 20 to generate an error signal. The active filter controller 150 further includes a first comparator 154a and a second comparator 154b for generating the first and second switch gating signals 156a and 156b, respectively. The positive input of the first comparator 154a receives the error signal from the combiner 152 and the negative input of the first comparator 154a receives a switch-timing signal, which limits the duration of an ON state for the first switch gating signals 156a. The negative input of the second comparator 154b receives the error signal output by the adder 152 and the positive input of the second comparator 154b receives the switch-timing signal, which limits the duration of an ON state of the second switch gating signals 156b. The switch-timing signal shown in the implementation of FIG. 3 is a dual triangular wave (DTW).

The switching frequency of the switch circuit 120 is a function of the DTW frequency, which primarily determines the filtering bandwidth of the active filter 100. The filtering bandwidth of the active filter 100 will be higher at higher switching frequencies of the switch circuit 120. Harmonics generated in the dc bus 300 by high frequency switching of the switch circuit 120 can easily be filtered using a small capacitor (not shown). By using the DTW as the switch-timing signal in the implementation of FIG. 3, switching loss is reduced (e.g., as compared to using a singular triangular waveform as the switch-timing signal) because switching by the switch circuit 120 will be suppressed when the error signal from the combiner 152 is small. Although a DTW switch-timing signal is used in the embodiment illustrated in FIG. 3, it should be realized that other switching techniques, e.g., a hysteresis switching method or a switching method using a singular triangular waveform, may be used.

With the filter controller 150 configuration illustrated in FIG. 3, the first comparator 154a outputs an ON state first switch gating signal 156a when the error signal is greater than the switch-timing signal (i.e., when the current harmonics measurement is greater than the compensating current and the error signal is greater than the switch-timing signal). On the other hand, the second comparator 154a outputs an ON state second switch gating signal 156b when the error signal is less than the switch-timing signal (i.e., when the current harmonics is less than the compensating current and the error signal is less than the switch-timing signal). The switch gating signals 156a, 156b output by the first and second comparators 154a, 154b will not be in an ON state simultaneously. To effectively limit the ON state durations of the switch gating signals 156a, 156b, it will clear to those skilled in the art that the peak amplitude of the switch-timing signal is set to be greater than the median amplitude the error signal. The frequency of the switch-timing signal, $f_{st}$, is preferably high relative to the fundamental frequency of the current harmonics, $f_{ch}$, thereby enabling the energy storage capacitor 103 to repeatedly charge-discharge during each period of the current harmonics so that the size of the energy storage capacitor 103 may be minimized. For example, $f_{st}$ may be a multiple of $f_{ch}$, e.g., $f_{st}$ 10 $\times f_{ch}$ for a nominal $f_{ch}$ of the harmonics source 200.

Figure 4:
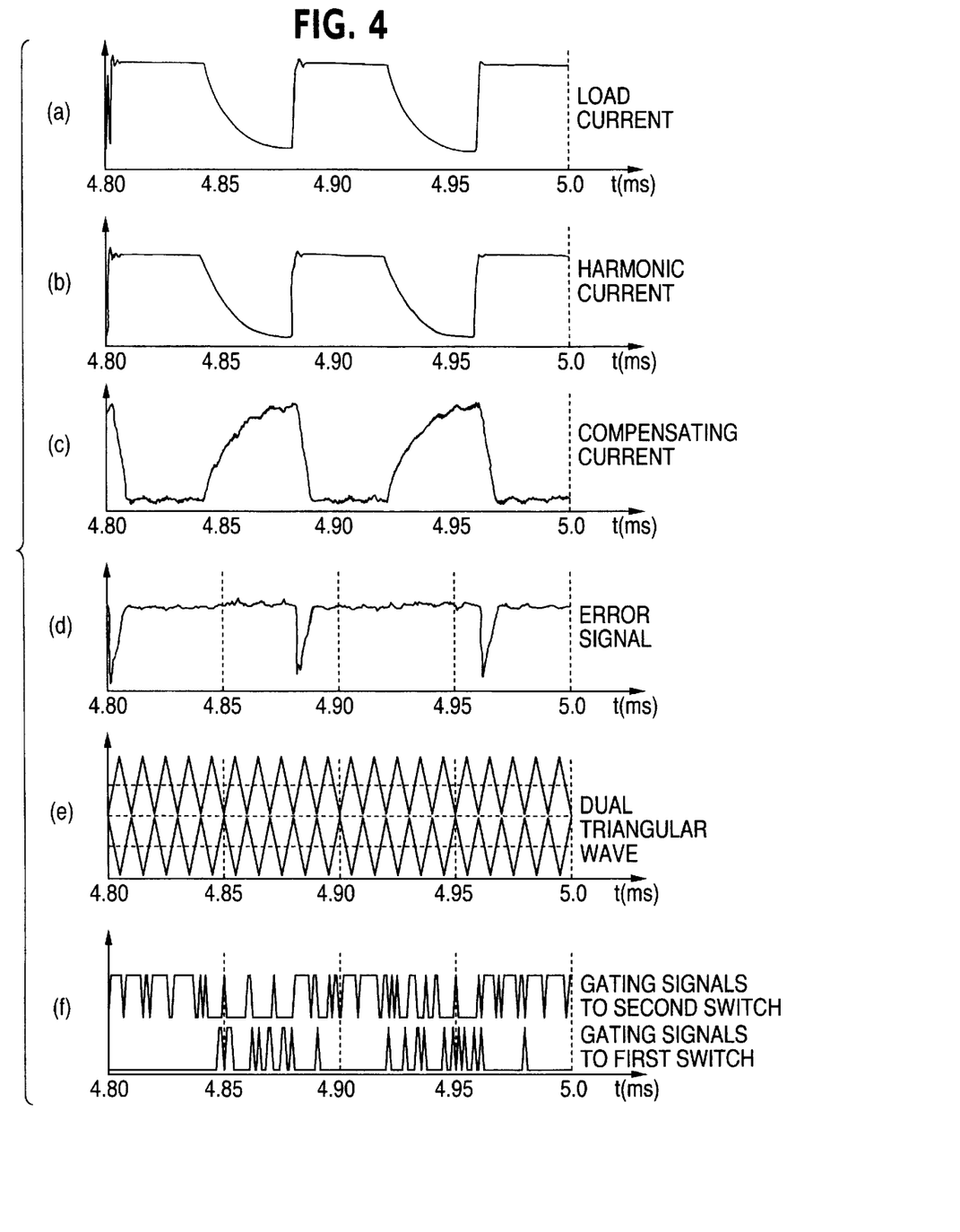
FIG. 4 shows a series of waveforms that demonstrate the operating principles of the active filter in accordance with the present invention.
Figure 5A:
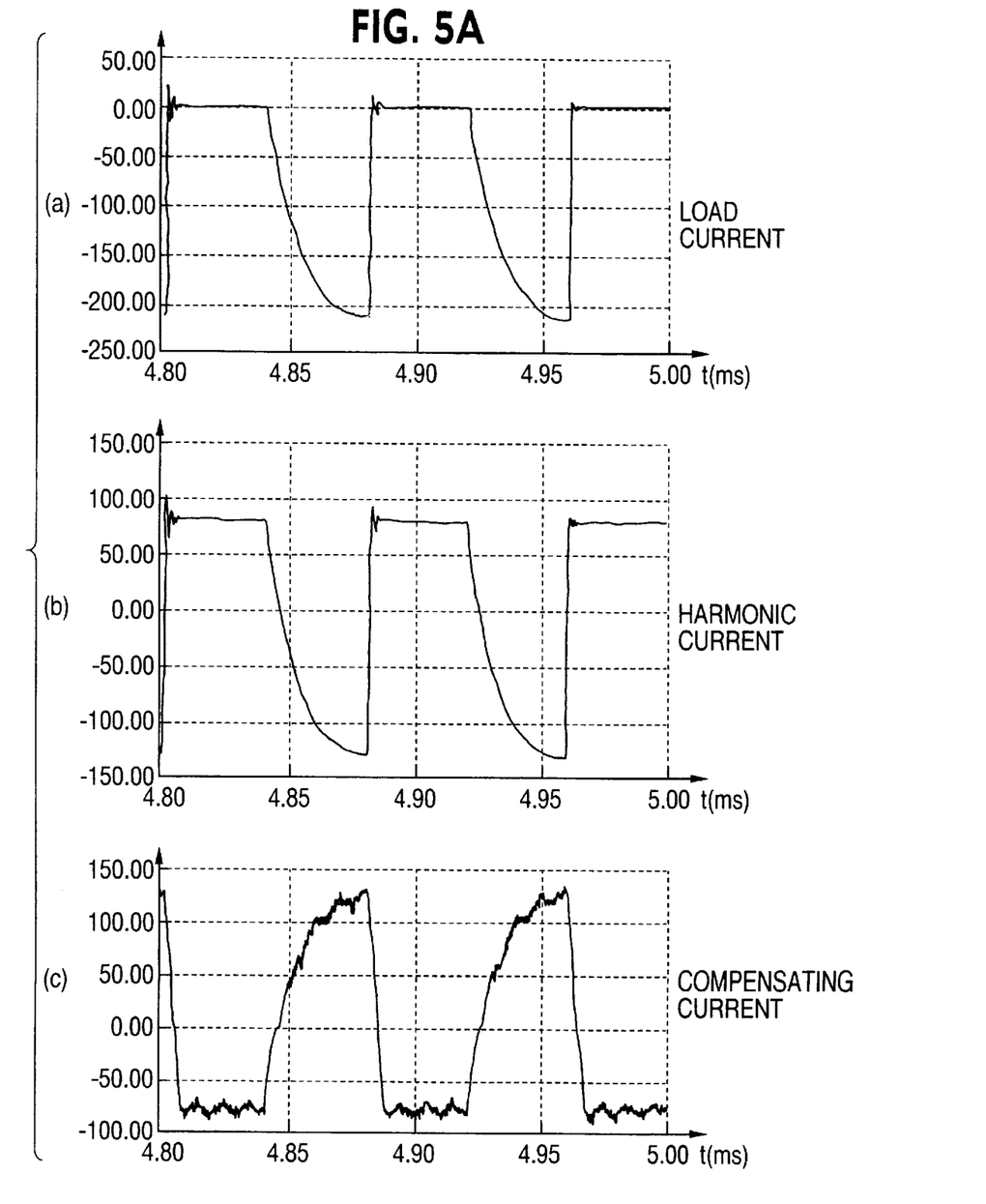
FIGS. 5A and 5B show the series of waveforms illustrated in FIG. 4 in detail to further demonstrate the operating principles of the active filter in accordance with the present invention.
Figure 5B:
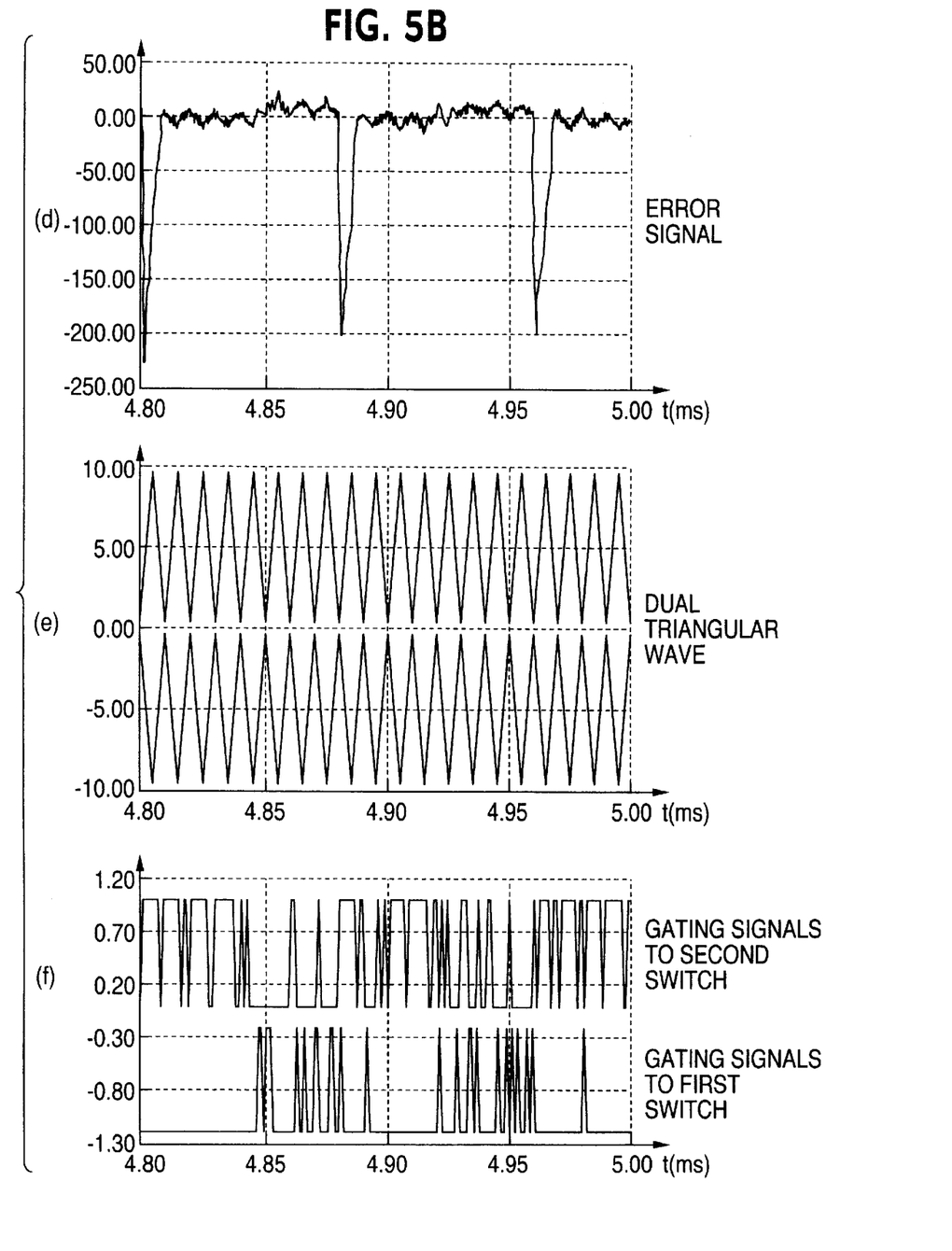

Next, operation of the active filter 100 embodiment illustrated in FIGS. 1–3 will be explained with reference to the waveforms shown in FIGS. 4 and 5A–B. Initially, it should be recognized that the waveforms of FIGS. 4 and 5A–B are merely provided to illustrate principles of the present invention and should not be considered as limiting the scope of the present invention. The waveforms of FIGS. 4 and 5A–B are based on the following parameters/values: (1) fundamental frequency of the current harmonics at 12.6 kHz (representing a dc pulse chopping rate of 12.6 kHz performed by the load); (2) an energy storage capacitor of 120 F; (3) an output choke of 5 H; and (3) a DTW switch-timing signal having a 9 amp peak amplitude and a frequency of 100 kHz. The waveforms shown in FIGS. 4 and 5A–B are for the time interval of 4.80–5.0 milliseconds. It should be recognized that the present invention is not limited to these specific values, which will vary depending on the practical application of the inventive concepts described herein.

FIG. 4 illustrates: the load current (waveform (a)) drawn by the harmonics source 200; the generated current harmonics (waveform (b)); the compensating current (waveform (c)) generated by the active filter 100 in accordance with the principles of the present invention; the error signal (waveform (d)) used by the first and second comparators 154a, 154b to generate the first and second switch gating signals 156a and 156b, respectively; the DTW switch-timing signal (waveform (e)); and the first and second switch gating signals 156a, 156b (waveform (f)). FIG. 5A shows waveforms (a), (b) and (c) in greater detail, such that the exemplary current values of the vertical axis (in amperes) can be seen. FIG. 5B shows waveforms (d), (e), and (f) in greater detail, such that the exemplary current values of the vertical axis (in amperes) can be seen, to demonstrate the timing of the first and second switch gating signals 156a, 156b generated by the filter controller 150 in relation to the state of the error signal.

As seen from waveforms (d) and (f) in FIGS. 4 and 5B, the first switch gating signal 156a is repeatedly turned to the ON state when the error signal is greater than zero. Thus, the first switch 122a is repeatedly turned ON to discharge current from the energy storage capacitor 103 via the first switch 122a and the output choke 104 to offset negative harmonics current (i.e., when current harmonics are flowing toward the harmonics source 200). As also seen in FIGS. 4 and 5B, the second switch gating signal 156b is repeatedly turned to the ON state when the error signal is less than zero. Thus, the second switch 122b of the switch circuit 120 is repeatedly turned ON to trap positive current harmonics to ground through the choke 104 (i.e., when the current harmonics are flowing away from the harmonics source 200).

As is apparent from the waveforms of FIGS. 4 and 5B, the ON states of the first and second switch gating signals 156a, 156b are responsive to changes in the polarity of the current harmonics, such that the generated compensating current automatically adapts to changes in frequency and/or amplitude of the current harmonics to generate an approximately equal-but-opposite in polarity compensating current. Thus, the active filter 100 according to the present invention reacts to changes in the operating state of the harmonics source 200 so as to be effective over a wide range of $f_{ch}$.

The foregoing merely illustrates the principles of the invention. It will be appreciated that those skilled in the art will be able to devise various arrangements which, although not explicitly described or shown herein, embody the sprit and scope of the present invention. For example, although an exemplary switch circuit 120 configuration has been detailed above having a pair of IGBTs, those skilled in the art will recognize the other switching arrangements are possible, e.g., using BJT transistors, MOSFETs, etc. Furthermore, although an exemplary filter controller 150 configuration illustrated in FIG. 3 may be implemented using all analog circuitry, it will be apparent to those skilled in the art that the filter controller 150 may be implemented in other ways, e.g., using all digital circuitry or a combination of digital and analog circuitry. These and other modifications to the specifically disclosed embodiment may be realized by those skilled in the art without departing from the spirit and scope of the present invention.

We claim:

1. An active harmonic filter that generates a compensating current to suppress current harmonics in a dc bus, comprising:
   an energy storage capacitor;
   a choke;
   a controller that receives a current harmonics measurement for said dc bus and generates switch gating signals in accordance with said current harmonics measurement; and
   a switch circuit that receives said switch gating signals, said switch circuit being operatively connected to said energy storage capacitor and said choke to repeatedly discharge said energy storage capacitor to inject current into said dc bus and to repeatedly trap harmonics current from said dc bus, thereby generating a compensating current that is approximately equal-but-opposite in polarity to said current harmonics measurement.

2. The invention as defined in claim 1, wherein
   said controller generates a first switch gating signal and a second switch gating signal, and
   said switch circuit includes a first switch, which receives said first switch gating signal and is operatively connected to said energy storage capacitor to selectively discharge said energy storage capacitor, and a second switch, which receives said second switch gating signal and is operatively connected to said choke to selectively draw current away from said dc bus via said choke.

3. The invention as defined in claim 2, wherein said first and second switches are transistors.

4. The invention as defined in claim 3, wherein
   said first and second switches are Insulated Gate Bipolar Transistors,
   the emitter of said first switch is connected to the collector of said second switch,
   the gate of said first switch is connected to said controller to receive said first switch gating signal,
   the emitter of said second switch is connected to ground,
   the gate of said second switch is connected to said controller to receive said second switch gating signal, said energy storage capacitor is connected between the collector of said first switch and ground, and said choke is connected between said dc bus and said emitter of said first switch.

5. The invention as defined in claim 4, wherein said switch circuit further includes a first diode, said first diode having an anode that is connected to the emitter of said first switch and a cathode that is connected to the collector of first switch, and a second diode, said second diode having an anode that is connected the emitter of said second switch and a cathode that is connected to the collector of said second switch, and when said first and second switches are closed, energy stored in said choke charges said energy storage capacitor via said first diode.

6. The invention as defined in claim 1, wherein said controller monitors said compensating current, generates an error signal indicating a difference between said current harmonics measurement and said compensating current, and generates said switch gating signals as a function of said error signal.

7. The invention as defined in claim 6, wherein said controller generates a first switch gating signal and a second switch gating signal, and said switch circuit includes a first switch, which receives said first switch gating signal and is operatively connected to said energy storage capacitor to selectively discharge said energy storage capacitor, and a second switch, which receives said second switch gating signal and is operatively connected to said choke to selectively draw current away from said dc bus via said choke, and said controller includes a first comparator, which compares said error signal with a switch-timing signal to generate said first switch gating signal, and a second comparator, which compares said error signal with said switch-timing signal to generate said second switch gating signal.

8. The invention as defined in claim 7, wherein said first comparator generates an ON first switch gating signal when said error signal is greater than said switch-timing signal and said second comparator generates an ON second switch gating signal when said error signal is less than said switch-timing signal.

9. The invention as defined by claim 7, wherein said switch-timing signal is a dual triangular waveform.

10. The invention as defined by claim 7, wherein said switch-timing signal has a frequency that is greater than a highest target harmonics frequency of said current harmonics measurement.

11. The invention as defined by claim 2, wherein said first switch is repeatedly activated and deactivated during each period of said current harmonics to inject current to said dc bus and said second switch is repeatedly activated and deactivated during each period of said current harmonics to draw current away from said dc bus and recharge said energy storage capacitor.

12. The invention as defined in claim 2, wherein said controller outputs said first and second gating signals as a function of changes in polarity of said current harmonics, and is operable over a wide band of fundamental current harmonics frequencies to control suppression of said current harmonics.

13. A method of suppressing current harmonics in a dc bus by generating a compensating current, said method comprising:

receiving a current harmonics measurement;

generating switch gating signals as a function of said current harmonics measurement; and outputting said switch gating signals to repeatedly discharge current from an energy storage capacitor into said dc bus and to repeatedly draw current harmonics from said dc bus, thereby generating a compensating current that is approximately equal-but-opposite in polarity to said current harmonics measurement.

14. The invention as defined in claim 13, wherein said step of generating switch gating signals selectively generates a first switch gating signal and a second switch gaiting signal, and said step of outputting outputs said first switch gating signal to a first switch, which is operatively connected to said energy storage capacitor, to selectively discharge said energy storage capacitor, and outputs said second switch gating signal to a second switch, which is operatively connected to said choke to selectively draw current away from said dc bus.

15. The invention as defined in claim 13, wherein said switch gating signals are generated as a function of an error signal, which indicates a difference between said current harmonics measurement and said compensating current.

16. The invention as defined in claim 15, wherein said switch gating signals are generated by comparing said error signal with a switch-timing signal.

17. The invention as defined in claim 15, wherein said step of generating switch gating signals generates a first switch gating signal and a second switch gaiting signal, and said step of outputting outputs said first switch gating signal to a first switch, which is operatively connected to said energy storage capacitor, to selectively discharge said energy storage capacitor, and outputs said second switch gating signal to a second switch, which is operatively connected to said choke to selectively draw current away from said dc bus, and said step of generating generates said first switch gating signal and said second switch gating signal by comparing said error signal with a switch-timing signal.

18. The invention as defined in claim 16, wherein said switch-timing signal is a dual triangular waveform.

19. The invention as defined in claim 16, wherein said switch-timing signal has frequency that is greater than a highest target harmonics frequency of said current harmonics.

20. The invention as defined in claim 14, wherein said step of outputting said switch gating signals repeatedly activates said first switch during each period of said current harmonics to inject current into said dc bus and repeatedly activates said second switch during each period of said current harmonics measurement signal to draw current away from said dc bus and recharge said energy storage capacitor.

21. The invention as defined in claim 14, wherein said step of outputting said switch gating signals outputs said first and second gating signals as a function of changes in polarity of said current harmonics measurement, thereby enabling suppression of current harmonics in said dc bus over a wide band of current harmonics fundamental frequencies.

22. The invention as defined in claim 1, wherein the filtering bandwidth of said active harmonic filter is determined by a switching frequency of said switch circuit.

23. The invention as defined in claim 13, wherein said method of suppressing current harmonics exhibits a filtering bandwidth that is determined by a frequency of outputting said switch gating signals.

* * * * *